VACUUM TIGHT LEAD THROUGHS FOR DEWAR MOUNTED INFRARED DETECTORS

Filed Nov. 23, 1970 3 Sheets-Sheet 1

INVENTORS
JASPER J. LONG
BEN JUSTUS
BY
Townsend and Townsend
ATTORNEYS

March 13, 1973 J. J. LONG ETAL 3,719,990

VACUUM TIGHT LEAD THROUGHS FOR DEWAR MOUNTED INFRARED DETECTORS

Filed Nov. 23, 1970 3 Sheets-Sheet 2

INVENTORS
JASPER J. LONG
BEN JUSTUS

BY

*Townsend and Townsend*

ATTORNEYS

INVENTORS
JASPER J. LONG
BEN JUSTUS
BY
Townsend and Townsend
ATTORNEYS 3,719,990

VACUUM TIGHT LEAD THROUGHS FOR DEWAR MOUNTED INFRARED DETECTORS

Jasper J. Long, Healdsburg, and Ben Justus, Petaluma, Calif., assignors to Optoelectronics, Inc., San Rafael, Calif.

Filed Nov. 23, 1970, Ser. No. 91,648
Int. Cl. H01j *9/18;* H01r *43/00*
U.S. Cl. 29—628 8 Claims

ABSTRACT OF THE DISCLOSURE

An improved construction and process for constructing vacuum tight lead throughs is disclosed for use with Dewar mounted multi-element infrared detectors.

This invention relates to the insertion of vacuum tight lead throughs in a Dewar type vacuum tube. More specifically, this invention relates to an improved process for the insertion of vacuum tight lead throughs in Dewar mounted multi-element infrared detectors.

It is already known to mount photovoltaic infrared detectors to Dewar mounting to provide improved detector performance. Typically, the infrared detectors are mounted to the outside surface of the inner flask of the Dewar where they are exposed to a vacuum. When the inner jar of the Dewar mounting is cryogenically cooled, improved infrared detector performance can be obtained.

Electrical connection between each of the detectors in the evacuated portion of the Dewar and the outside or non-evacuated portion of the Dewar is provided by conductive elements inserted throuhg the sidewalls of the Dewar. Heretofore, these conductors extending through the sidewalls of the Dewar have been handled separately and supported separately while glass is fused around them to make a vacuum tight electrical path.

These prior construction practices have had serious disadvantages. Where many individual detectors are mounted to a single Dewar, the individual handling and holding of the lead throughs while glass is formed around them is laborious. Moreover, in many applications the lead throughs are placed so that they either fail to entirely penetrate the Dewar, come in contact with each other to cross-connect their separate electrical paths, or alternately are inadvertently insulated with glass so that their subsequent electrical connection into the corresponding individual infrared detector elements is not possible.

An object of this invention is to provide a process for placing vacuum tight lead throughs in a Dewar infrared detector mounting. According to this aspect of the invention, a cylindrical portion of the Dewar is divided into first and second overlying sections. A plurality of flat conductive strips are mounted in spoke-like orientation to an outer supporting rim and clamped at the lead throughs between the Dewar sections. In this position the glass portions of the Dewar are fused together entrapping the lead throughs therebetween. A plurality of vacuum tight electrical paths along the lead throughs is provided.

An advantage of this invention is that the separate handling, holding and fusing of the lead throughs on an individual basis is avoided.

A further advantage of this invention is that the lead throughs can be provided with a flat rectangular section which has a small dimension between the confronting or overlying portions of the Dewar. This construction provides a relatively short path for the glass to flow when it is simultaneously fused around all of the individual lead throughs.

Yet another object of this invention is that the lead throughs extend through and beyond the walls of the Dewar before fusion occurs. When fusion has occurred their complete electrical penetration through the sidewalls of the Dewar is assured.

Another object of this invention is to provide a Dewar construction having an improved lead through array.

An advantage of this lead through array is that the individual lead throughs can be placed in precise radial alignment to provide for convenient electrical terminals at both their inside and outside ends.

Yet another advantage of this invention is that the Dewar can be constructed with a high lead through density.

Yet another object of this invention is to provide an apparatus for forming the lead throughs and Dewar in precise concentric relation.

An advantage of the precise concentric relation of the Dewar and lead throughs is that the subsequently fabricated Dewar mounting can accommodate cryostat type Joule-Thompson coolers which require a precision bore interior of the Dewar flask for their insertion.

Yet another advantage of the forming apparatus is that the molding prevents inadvertent glass covering and hence inadvertent electrical insulation of the installed lead throughs.

Other objects, features and advantages of this invention will become more apparent after referring to the following specification and attached drawings in which.

Figure 3:
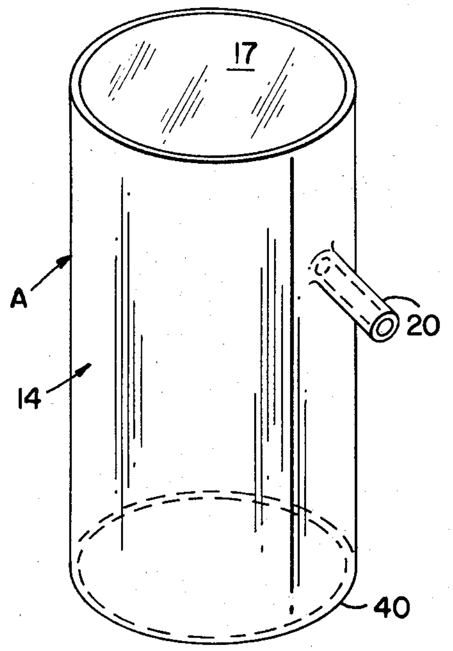
FIG. 3 illustrates the Dewar mounting of FIGS. 1 and 2 just prior to its final assembly; and, FIG. 4 is a diametric section of a cylindrical mold used for fastening the Dewar parts together in precise concentric relation.

Referring to FIG. 3, the Dewar mounting of infrared detectors can be conveniently illustrated. Outside Dewar cylinder A and inside Dewar cylinder B are shown placed in overlying relation. Outside Dewar cylinder A is divided into two portions. First portion 14 is shown concentrically located overlying inside Dewar B. Second portion 15 of outside Dewar A is shown fused to Dewar cap C which extends between outside Dewar cylinder A at its outer portion and inside Dewar cylinder B at its inner portion.

The upper ends of the Dewar cylinders A and B are both closed. Outer Dewar cylinder A is sealed by a transparent window 17. Inner Dewar cylinder B is closed by an infrared photosensitive element supporting disc 18.

When the portions 14, 15 of outside Dewar cylinder A are joined together, a Dewar flask is formed. This flask when evacuated through a lead out 20 between the spatial interval intermediate outer cylinder A and inner cylinder B provides a vacuum having excellent thermal insulation properties.

A plurality of infrared elements 22 are typically supported on top of supporting surface 18 of inner Dewar cylinder B. In this location, infrared elements 22 are exposed only to vacuum, spaced a small interval from window 17, and connected in separate parallel circuits.

The parallel circuits to each of the infrared elements includes two grounds 24 at either end of the strip of photosensitive infrared elements 22 and individual wire leads 25 extending from each infrared element 22 to separate radial locations on the periphery of the supporting disc 18.

Ground wires 24 and individual Dewar leads 25 are each provided with silvered electrical strips 27 extending between Dewar supporting disc 18 and Dewar cap C. As is well understood in the art, the outer surface of Dewar B is silvered, indexed and scribed, and finally etched to define silvered strips 27 of small thickness. Strips 27 serve to provide an efficient electrical path to the infrared elements 22 while at the same time arresting thermal conduction between infrared elements on one hand and the end of the Dewar mounting adjacent cap C on the other hand.

The vacuum tight lead throughs D provide the electrical connections through the sidewalls of the Dewar to each of the silvered strips 27. As here illustrated, lead throughs D extend through the sidewalls of outer Dewar cylinder A to the base of each of the silvered strips 27. It is thus seen that each of the lead throughs D provides an electrical path connected in parallel to each of the infrared elements 22.

Figure 1:
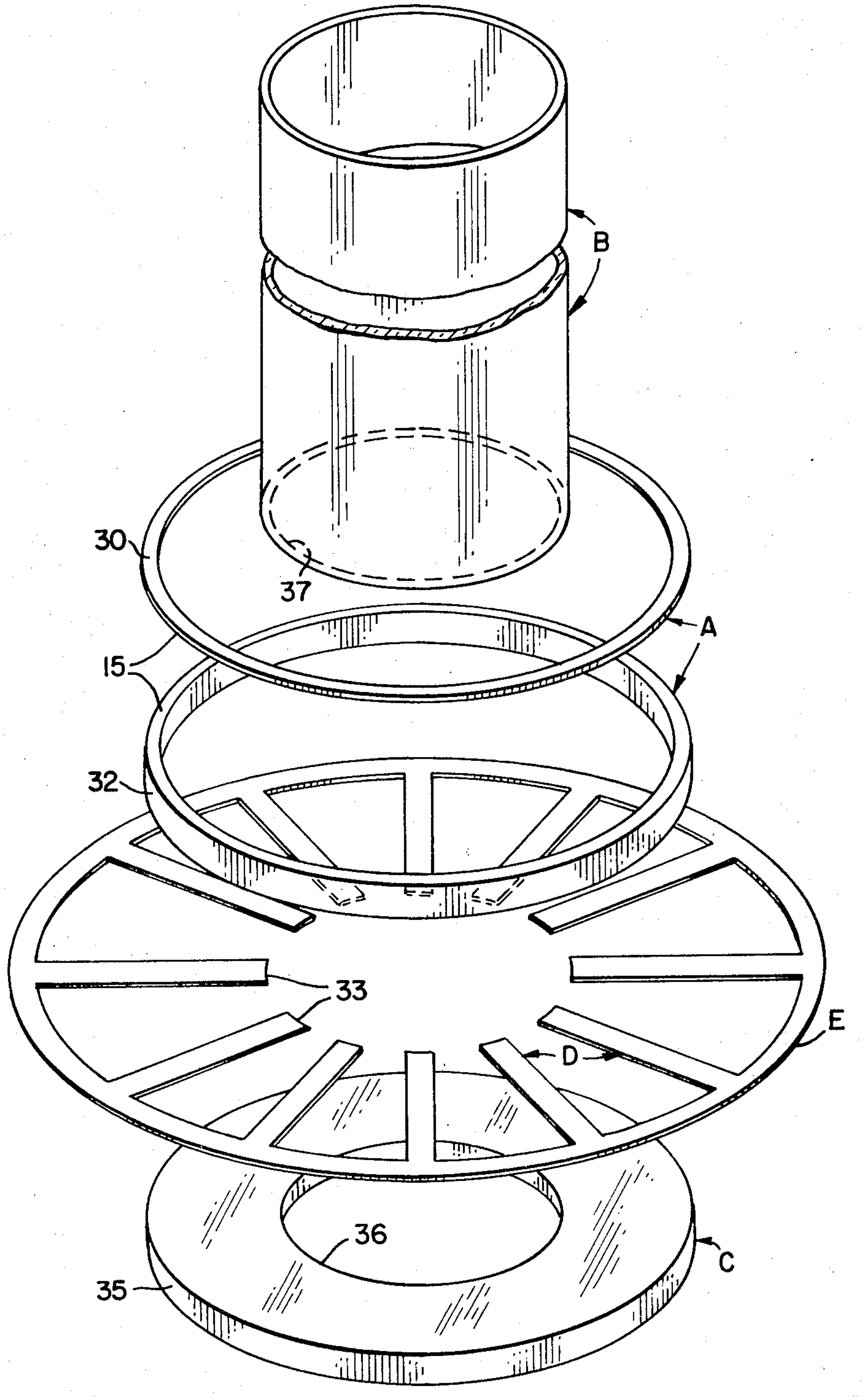
FIG. 1 is an exploded view of that portion of an infrared detector Dewar mounting containing lead throughs, the Dewar portion here being illustrated prior to fusion.
Figure 2:
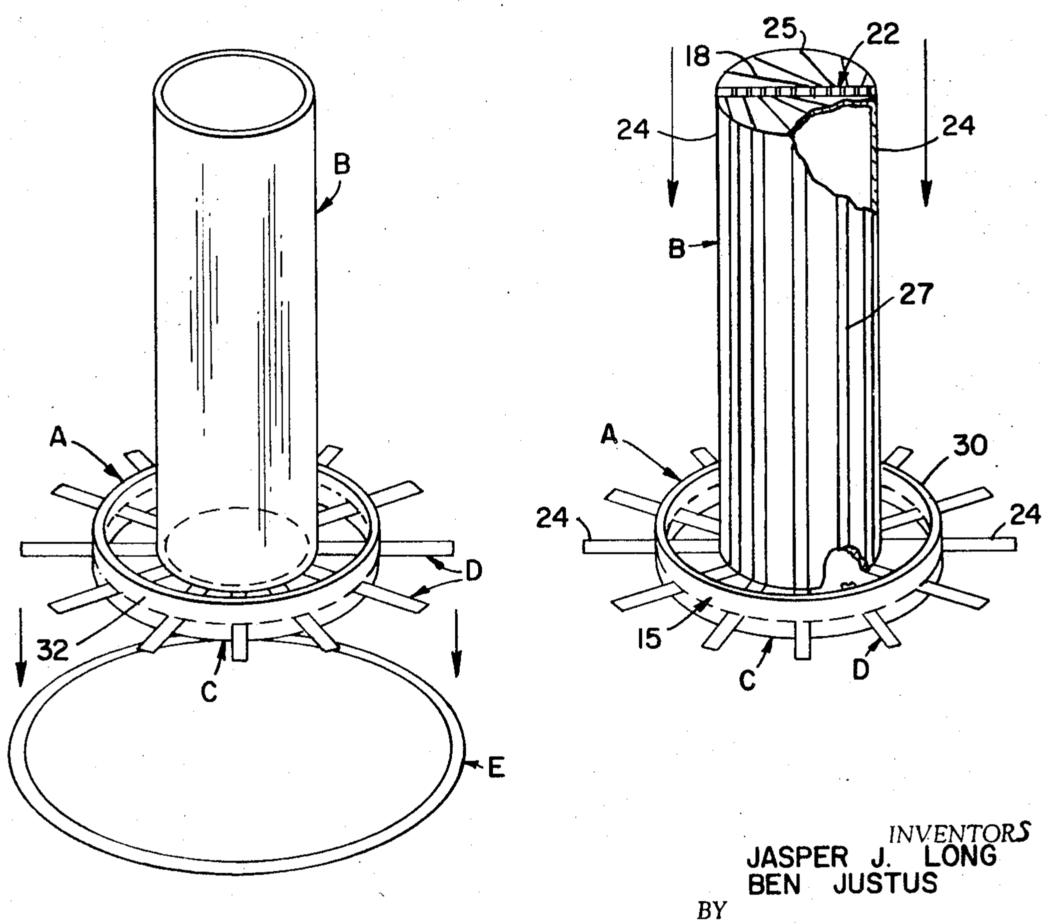
FIG. 2 is a view on a reduced scale of the Dewar portion of FIG. 1 after fusion with the supporting rim for the individual lead throughs detached.

Referring to FIGS. 1 and 2, the process for the construction of the lead throughs of this invention can be conveniently illustrated by first depicting the component adjacent the lead throughs and then illustrating these components as fused together.

Outer Dewar cylinder A as shown in FIG. 1 at portion 15 includes a seal rim 30 and a glass ring 32. In the fabrication of portion 15 of outside Dewar cylinder A illustrated in FIG. 1, rim 30 is fused to glass ring 32 and forms the surface to which portion 14 of outer Dewar cylinder A is subsequently attached (see FIG. 3).

Lead throughs D are shown in FIG. 1 attached to an outer supporting rim E. Rim E supports each of the lead throughs D at their outer end and permits the lead throughs D to extend at their inner end radially towards the center of the rim. Lead throughs D are not connected together at their innermost portion.

Lead throughs D and supporting rim E are fabricated by photo-etching a single flat piece of conductive metal. Typically this metal has a thickness in the range of ten one thousands (0.010) of one inch.

The desired lead through density can be changed at will. As here illustrated only twelve lead throughs are shown. In actual practice a much higher lead through density is employed. For example one hundred forty-four lead throughs have been installed to a Dewar flask mounting having an inside cylinder diameter of 0.700 inch.

The outer diameter of rim E is selected to provide convenient separation between each of the lead throughs D as they extend from the Dewar mounting. Lead throughs D at their inner ends 33 terminate at a radius which is equal to or preferably slightly greater than the outside diameter of inner Dewar cylinder B. It is thus seen, that the lead throughs at their inner end 33 will typically not be fused to or between inner Dewar cylinder B and cap C.

Preferably seal ring 30, lead thorughs D, and supporting rim E are fabricated from a cobalt nickel alloy sold under the registered trademark "Kovar" by the Westinghouse Electrical Corporation. Additionally, inner Dewar flask B, outer Dewar flask A and cap C are fabricated from glass sold under the trademark "7052" by the Corning Glass Corporation.

It is well known in the art that "Kovar" and "Corning Glass 7052" have very desirable properties for the fabrication of infrared detectors. First, the metal "Kovar" when oxidized on the outside surface produces an oxide which readly fuses with glass. A vacuum tight interface between the glass on one hand and the metal "Kovar" on the other hand can easily be produced. Secondly, the metal "Kovar" and "Corning Glass 7052" have a coefficient of expansion which is substantially identical between the temperature at which the glass and metal are fused and temperatures in the cryogenic range at which the infrared detectors of this invention typically operate. Thus despite wide temperature variation the vacuum tight interface between the metal "Kovar" on one hand, and the glass "7052" on the other hand is not interrupted or changed. It should be apparent that other glass and metal combinations having identical coefficients of expansion between this fusion temperature on one hand and the cryogenic infrared operating temperature on the other hand can be used with this invention.

Cap C is typically a disc of glass having concentric outside diameter 35 and an inside aperture 36. Outside diameter 35 is equal to the outside diameter of glass ring 32 of outer Dewar cylinder A. This enables the glass ring 32 to fuse the cap C. Inside diameter 36 is the same as the inside diameter 37 of inside Dewar cylinder B. It is thus seen that cylinder B will fuse to cap C.

Since lead throughs D at ends 33 terminate adjacent the outside walls of inner Dewar cylinder B, the spatial intervals between the lead throughs' ends 33 on one hand and the outside surface of inner Dewar cylinder B will be small. The connection between the lead throughs D and the silver strips 27 subsequently placed on the outside of cylinder B will be easily made.

Referring to FIG. 2, the parts of the Dewar illustrated in the exploded view of FIG. 1 are shown fused. As can be seen glass ring 32 of outer Dewar cylinder A is fused to cap C with vacuum tight lead throughs D captured therebetween. Each of the lead throughs D at their respective ends 33 terminate immediately adjacent the outside sidewalls of inner Dewar cylinder B.

When this fusion has been completed, supporting rim E is detached from each of the lead through D. Typically, such detachment can be made by stamping, cutting or the like. Rim E is then discarded leaving lead throughs D each to define separate conductive paths.

When the Dewar mounting has been partially fabricated as illustrated in FIG. 2, the infrared supporting disc 18 is typically fastened to the top of inside Dewar cylinder B. Thereafter, the infrared elements 22 connecting wires 24, 25, conductive strips 27 are each installed on the outside of the inner Dewar cylinder B. Once this is accomplished the remainder of outside Dewar cylinder A, is placed over and sealed onto seal ring 30. Typically, this is done by having a complementary seal ring 40 on the open end of upper portion 14 of outside Dewar cylinder A. By the placement of solder between seal ring 40 on one hand and seal ring 30 on the other hand a vacuum tight connection can be effected and the complete Dewar mounting assembly fastened together. With the drawing of a vacuum through tube 20 and closing of tube 20 thereafter completion of the infrared Dewar mounted detector occurs.

Obviously the construction process here illustrated in FIGS. 1 through 3 can occur in many different ways. Fusion of the lead throughs, for example, could be made by hand or with any number of tools known and understood in the vacuum tube glass blowing construction art. However, with reference to FIG. 4, a specially adapted mold is illustrated which can be used.

Figure 4:
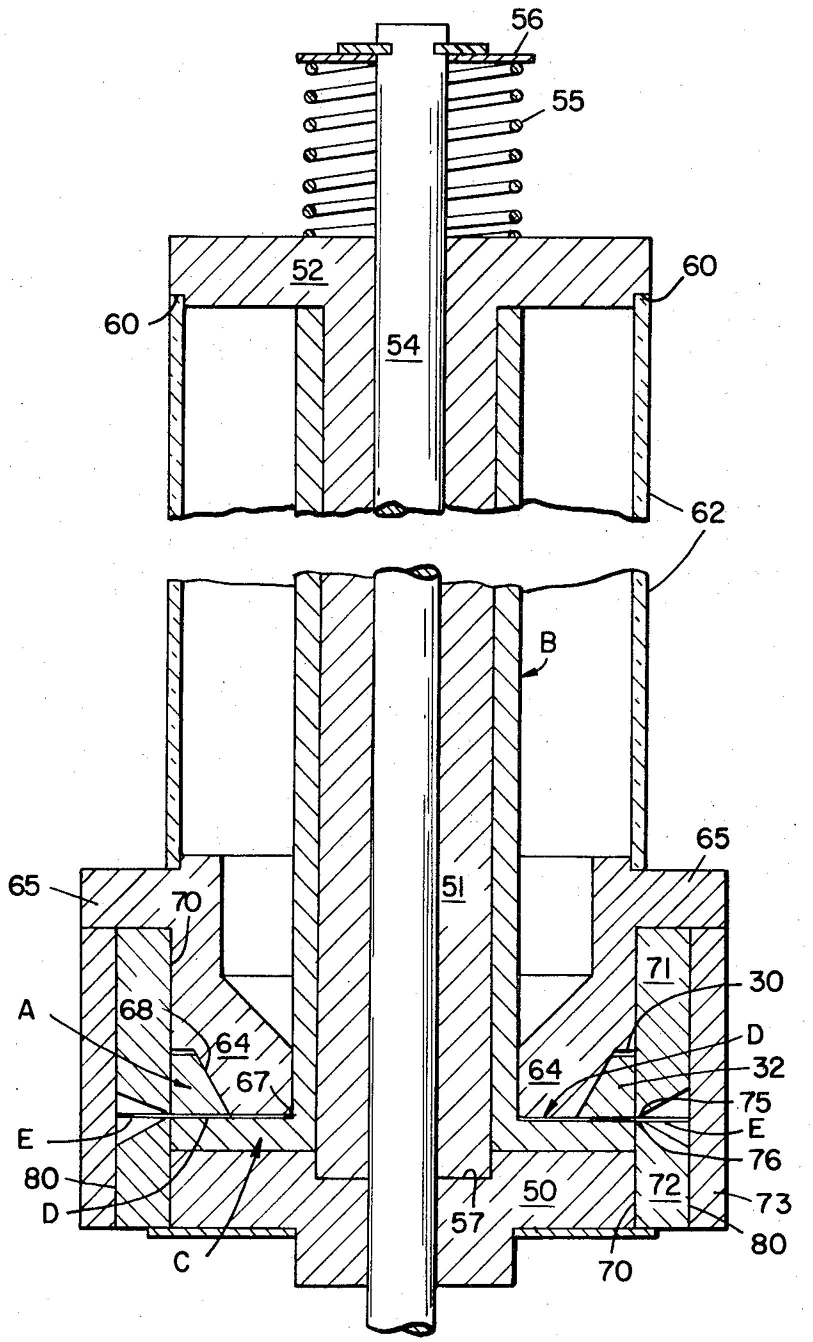

Referring to FIG. 4, a mold is illustrated for the production of the vacuum tight lead through apparatus illustrated in FIG. 2. It will be remembered that FIG. 4 is a diametric section of a cylindrical mold.

Typically, the mold includes graphite base 50, hollowed graphite rod 51 with a flange 52 integrally attached to the upper end thereof. Base 50 and rod 51 is centered on steel rod 54. Coil spring 55 and shaft locked washer 56 are used to bias rod 51 at flange 52 downwardly and onto base 50. Cylinder 51 at its lower end fits interior of a pocket 57 defined in the upward portion of base 50. This precisely centers the cylinder 51 with respect to base 50.

Cylinder 51 has an outside diameter which is precisely dimensioned with respect to the inside diameter of inner Dewar cylinder B and the inside diameter of Dewar cap C. The outside surface of graphite cylinder 51 thus serves to center and hold in place the Dewar cap C with respect to the inside bore of inside Dewar cylinder B. A precise concentric relation is thus formed between Dewar cap C and inside Dewar cylinder B.

Flange 52 is concentrically notched at 60 at its outer lower periphery. This notch accommodates concentrically therein the upper lip of a quartz cylinder 62. Cylinder 62 functions to transmit the bias of coil spring 55 from flange 52 to the lower portion of the mold. The lower portion of the mold in turn functions to compress seal rim 30, and glass ring 32 over lead throughs D and onto cap C.

Quartz cylinder 62 at its lower end bears against mold section 64 at a concentric notch 63. Mold section 64 defines flange 65 at its upper portion and extends inwardly to the juncture between the inner Dewar cylinder B and Dewar cap C at 67. From point 67, mold section 64 extends upwardly and vertically parallel to the sidewalls of inner Dewar cylinder B. Additionally, from point 67, mold section 65 extends horizontally overlying and in contact with lead throughs D, sandwiching the lead throughs between Dewar cap C and the horizontal surface of the mold section extending concentrically outward from point 67.

Mold section 65 flares upwardly from contact with lead throughs D obliquely outward from the sidewalls of glass ring 32 and seal ring 30. Typically, the mold is dimensioned at surfaces 68 to impart to glass ring 32 a truncated frustroconical inside dimension.

Below flange 65, mold section 64, mold base 50, and the outer diameters of Dewar cap C, glass ring 32 and seal rim 30 provide together an outside cylindrical surface 70 which is equal to the diameter of the outside of outside Dewar cylinder A. This surface 70 accommodates concentrically thereover three mold cylinders 71, 72, and 73.

Cylinder 71, fits concentrically over the cylindrical surface 70 defined by the upper portion of mold section 64 adjacent flange 65. This cylinder 71 has a vertical dimension sufficient to contact lead throughs D at 75 and to snuggly compress the lead throughs D downwardly.

Likewise, lower ring 72 has a dimension sufficient to fit over the outside surface 70 of base 50 and fit snugly against the bottom portion of lead throughs D at 76. This ring 72 at 76 serves to compress lead throughs D upwardly.

Typically, both cylinder 71 and cylinder 72 adjacent lead throughs D and outer rim E are tapered. This taper provides confronting surfaces at 75, 76 adjacent glass ring 32 and Dewar cap C. This concentration defines a cavity about the outer ends of the lead throughs D and the rim E. During fusion, glass flow from either Dewar cap C or glass ring 32 into the cavity and over the lead throughs D and glass ring E is arrested.

Rings 71 and 72 define at their outside periphery a cylindrical surface 80. Cylindrical surface 80 is the surface over which cylinder 73 is placed.

Cylinder 73 serves to center rim E with respect to the remaining components of the Dewar mounting illustrated in FIG. 2. Thus, rim E and its attached lead throughs D are precisely and concentrically centered with respect to the remaining portions of the Dewar mounting including seal ring 30, glass ring 32, Dewar cap C and inner Dewar cylinder B.

With the exception of quartz cylinder 62, center steel rod 54, coil spring 55 and washer 56, all parts of the mold illustrated in FIG. 4 are made of graphite. This graphite, when exposed to radio frequency energy, becomes sufficiently hot to fuse the respective glass and metal sections of the Dewar assembly of FIG. 2 together.

It should be apparent that both the mold and Dewar portions here illustrated can be made of any number of constructions. These constructions could include those where the rim and lead throughs are fused at different locations along either the outside Dewar cylinder or inside Dewar cylinder of the infrared detector mounting. Likewise, lead throughs D could be mounted away from Dewar cap C so as to extend between the sidewalls of Dewar cylinders A and B. Likewise, many other modifications may be made to this invention without departing from the spirit and scope thereof.

In the claims:

1. A process for fabricating vacuum-tight lead throughs in a Dewar mounting comprising the step of: providing a supporting rim having a plurality of lead throughs extending from said rim in spoke-like orientation; providing a Dewar flask having first and second overlying flask portions; fusing said overlying Dewar flask portions across said lead throughs at points removed from said rim; and, detaching said rim from said lead throughs after said fusing.

2. The invention of claim 1 and wherein said provided rim has said lead throughs extending radially inward.

3. The invention of claim 1 and wherein said provided flask has first and second portions defined from one Dewar cylinder.

4. The invention of claim 1 and wherein said fusing step comprises: providing a first mold about said first Dewar flask portion and a second mold about said second Dewar flask mold with overlying portions of said Dewar flask exposed towards one another; placing said lead throughs between said first and second molds at said overlying portions; and, heating said molds to fuse said Dewar flask across said lead throughs.

5. A process for constructing vacuum-tight lead throughs in a Dewar mounting for infrared detectors comprising the steps of: providing a Dewar flask top defining concentric inside and outside diameters, said inside diameter having the inside dimension of the inside Dewar flask and said outside diameter having the outside dimension of said outside Dewar flask; providing a rim with a plurality of lead throughs supported at their ends on said rim; placing said lead throughs extending over said top; fusing one of said Dewar flask over said lead throughs to said cap; and, detaching said rim after said fusing.

6. The invention of claim 5 and wherein said fusing step includes fusing said outside Dewar flask over said lead throughs to the cap of said Dewar.

7. The invention of claim 5 and wherein said fusing step comprises: providing a first mold about said top and a second mold about said Dewar cylinder with said top and cylinder confronted from said molds; placing said lead throughs between said first and said second molds at said confronted top and cylinder and heating said molds to fuse said lead throughs between said cylinder and said top.

8. A process for fabricating vacuum-tight lead throughs in a Dewar mounting comprising the steps of: providing first and second molds defining thereon first and second concavities for receiving first and second portions of a Dewar flask, said molds configured to confront overlying portions of said Dewar flask; providing a plurality of vacuum-tight lead throughs; supporting said lead throughs by attachment to a rim at one end of said lead throughs; providing and placing corresponding Dewar flask portions into each said molds; confronting said molds at said overlying Dewar flask portions with said lead throughs clamped therebetween; heating said mold portions to fuse said Dewar portions together with said lead throughs therebetween; and, detaching said rim on said lead throughs after said fusing

References Cited

UNITED STATES PATENTS

| | | | |
|---|---|---|---|
| 2,695,443 | 11/1954 | Wagner | 29—628 U X |
| 2,720,578 | 10/1955 | Caffiaux et al. | 29—628 X |
| 2,796,458 | 6/1957 | Hartmann | 29—628 U X |
| 3,148,356 | 9/1964 | Hedden, Jr. | 29—628 U X |
| 3,321,657 | 5/1967 | Granitsas et al. | 29—628 X |
| 3,425,021 | 1/1969 | Fow et al. | 29—629 X |

ROBERT L. SPICER, Jr., Primary Examiner

U.S. Cl. X.R.

29—25.13